No. 865,570. PATENTED SEPT. 10, 1907.
J. M. CRAFTS.
GEAR SHIFTING DEVICE.
APPLICATION FILED FEB. 13, 1907.
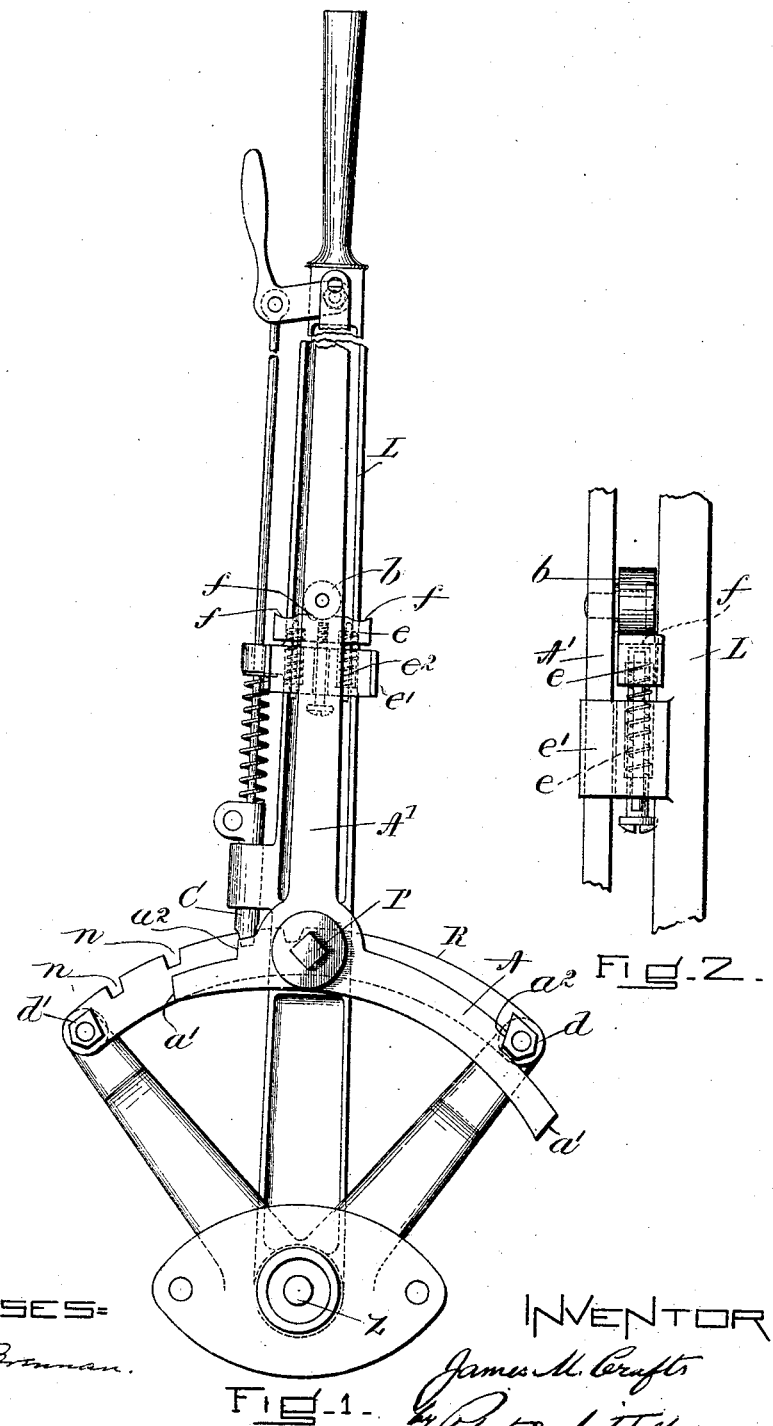

UNITED STATES PATENT OFFICE.

JAMES M. CRAFTS, OF BOSTON, MASSACHUSETTS.

GEAR-SHIFTING DEVICE.

No. 865,570.     Specification of Letters Patent.     Patented Sept. 10, 1907.

Application filed February 13, 1907. Serial No. 357,225.

*To all whom it may concern:*

Be it known that I, JAMES M. CRAFTS, a citizen of the United States, and a resident of Boston, in the county of Suffolk and State of Massachusetts, have invented new and useful Improvements in Gear-Shifting Devices, of which the following is a specification.

My invention relates to levers for operating and controlling power driven machinery and is particularly applicable to the change speed levers of motor vehicles.

My invention relates more specifically to the change speed levers of motor vehicles which employ the "straight through" gear shift as distinguished from the selective gear shift wherein the position of the change speed lever is used to select one of a number of gears for movement which is not shared by others of the same system.

My improvements herein to be described lend to the gear shifting lever of a "straight through" system the same definiteness of action as constitutes one of the claimed virtues of the selective system.

In the drawings hereto annexed, which illustrate an embodiment of my invention Figure 1 is a side elevation of a gear shifting lever, and Fig. 2 a front elevation on a larger scale, showing a detail of the spacer shifting devices of Fig. 1.

The lever L is pivoted at Z and carries the usual locking bolt C which coöperates with the notches $n$, $n$ in the segmental rack bar R. Upon a pivot P secured to the lever L there is movably mounted the spacer A which, generally speaking, is segmental in shape and lies approximately parallel to the rack bar R. Secured to or forming a part of the spacer A, I provide the shifting arm A′ which extends along and close to the lever L. The spacer A is provided with shoulders $a^2$ and end extensions $a'$ which reach out in either direction beyond the shoulders $a^2$. I provide also stationary stops $d$, $d'$ which serve as checks or abutments against which the spacer A makes contact in one direction or the other as the lever L is shifted. The spacer A may be placed in one of several determinable positions. As shown in the drawing the lever L is held by the bolt C in the first speed position (assuming the contrivance to be attached to a motor vehicle). If now it be desired to shift into the second speed position by moving the lever to the left as shown in the drawing, the bolt C is withdrawn and the lever L pressed forward. The left hand end $a'$ of the spacer A brings up against the stop $d'$ checking the lever L at the position where bolt C registers with the second speed notch $n$ of the rack bar R, and the arrest of the lever by the coaction of the stop $d'$ and the end of the spacer A is the signal for the operator to release the bolt C and allow it to enter the appropriate notch. On returning to the first speed position the bolt C is withdrawn, lever L moved in the other direction until the right hand shoulder $a^2$ brings up against the stop $d$, and again, release of the locking bolt C will cause the same to engage the first speed notch as before.

A block $e'$ is secured to the lever L and carries the spring-elevated cross-head $e$ which is provided on its upper surface with depressions $f$ and is constantly pressed upward by springs $e^2$. The depressions $f$ engage and coöperate with a roller pin $b$ secured on the inner side of the upwardly extending bar A′ and the engagement of the roller pin $b$ in one of the depressions $f$ holds the bar A′ and consequently the spacer A in any one of three determinable positions. If after the lever L has been shifted as above described into the second speed position, it be desired to move it into the third speed position, the bar A′ is moved forward (to the left as shown in the figure) so that the roller pin $b$ engages with the most forward depression $f$. The spacer A is thus rocked into a new position whereby the left hand end $a'$ thereof is freed from engagement with the stop $d'$ and the right hand end thereof is brought upward into opposition with the stop $d$. When the spacer is in this position the lever may be moved forward, after disengagement of the bolt C, until the left hand shoulder $a^2$ of the spacer abuts against the stop $d'$ and may be moved back until the right hand end $a'$ of the spacer abuts against the stop $d$. In order to turn the lever into reverse-gear position, the shifting bar A′ is moved so that the roller pin $b$ engages with the rearmost depression $f$ when the spacer will clear the stop $d$. Thus by simply shifting the position of the spacer bar A′ the gear shifting movement of the lever L is rendered as secure, positive and definite as possible.

What I claim and desire to secure by Letters Patent is:

1. The combination of a lever, a rack, a hand-controlled bolt on the lever to engage the rack notches, a spacer, stops to engage the spacer, and means to move the spacer into and out of stop-engaging position.

2. The combination of a lever, a locking bolt on the lever to engage the rack-notches, a spacer, movably mounted on the lever, stops to engage the spacer, and a catch to hold the spacer in one of several determinable positions.

3. The combination of a lever, a rack, a locking bolt on the lever to engage the rack-notches, a spacer, parallel and adjacent to the rack, and pivoted on the lever, an arm on the spacer extending along the lever, stops to engage the spacer, and a catch to hold the spacer arm in one of several determinable positions in relation to the lever.

4. The combination of a lever, a rack, a locking bolt on the lever to engage the rack-notches, a spacer, provided with shoulders, and ends extending beyond the shoulders, said spacer pivoted to the lever and movable into several determinable positions, in each of which a shoulder and end of the spacer engage respectively with stops, the stops, and a catch to hold the spacer in any one of its said determinable positions.

Signed by me at Boston, Suffolk county, Massachusetts, this seventh day of February, 1907.

JAMES M. CRAFTS.

Witnesses:
    ODIN ROBERTS,
    CHARLES D. WOODBERRY.